United States Patent
Martin et al.

(10) Patent No.: US 6,799,974 B2
(45) Date of Patent: Oct. 5, 2004

(54) TAXIDERMY HEAD MANNEQUIN AND MOUTH ASSEMBLY

(75) Inventors: Roger Martin, Albemarle, NC (US);
Jim Brandenburg, Whitehall, MT (US)

(73) Assignee: McKenzie Supply, Granite Quarry, NC (US)

( * ) Notice: Subject to any disclaimer, the term of this patent is extended or adjusted under 35 U.S.C. 154(b) by 0 days.

(21) Appl. No.: 10/413,790

(22) Filed: Apr. 14, 2003

(65) Prior Publication Data

US 2003/0198926 A1 Oct. 23, 2003

Related U.S. Application Data

(60) Provisional application No. 60/373,105, filed on Apr. 17, 2002.

(51) Int. Cl.[7] .......................... G09B 23/00; A01N 1/00; A01N 35/00
(52) U.S. Cl. .................... 434/295; 434/296; 428/542.4; 428/16
(58) Field of Search ................................ 434/295, 296, 434/263; 428/542.4, 16; 433/1

(56) References Cited

U.S. PATENT DOCUMENTS

| | | | | |
|---|---|---|---|---|
| 1,432,704 A | * | 10/1922 | Lichtenstein ..................... | 2/65 |
| 1,667,205 A | * | 4/1928 | Ingwersen ................... | 434/296 |
| 2,306,464 A | * | 12/1942 | Nowotny ..................... | 434/296 |
| 2,831,271 A | * | 4/1958 | Stitt ............................ | 434/296 |
| 4,359,320 A | * | 11/1982 | Thomas ....................... | 434/296 |
| 4,544,361 A | * | 10/1985 | Van Veen et al. ........... | 434/296 |
| 4,735,752 A | * | 4/1988 | Negethon, Jr. ............... | 264/19 |
| 4,775,323 A | * | 10/1988 | Johnson ....................... | 434/296 |
| 5,015,532 A | * | 5/1991 | Knight ..................... | 428/542.4 |
| 6,458,434 B1 | * | 10/2002 | Coombs, Jr. ................. | 428/16 |
| 2001/0029691 A1 | * | 10/2001 | Angelone | |

* cited by examiner

Primary Examiner—Jacob K. Ackun
Assistant Examiner—Faye Francis
(74) Attorney, Agent, or Firm—Akin Gump Strauss Hauer & Feld, LLP

(57) ABSTRACT

A combination of an animal taxidermy head mannequin and mouth assembly includes a mouth shell, a mannequin head and a commercially available jaw set. The mouth shell has upper and lower jaws, upper and lower lips, a chin and a nose. The mouth shell is dimensionally adapted to receive the commercially-available jaw set to form the mouth assembly. The head mannequin includes an oral cavity which is dimensionally adapted to receive the mouth assembly.

5 Claims, 6 Drawing Sheets

TAXIDERMY HEAD MANNEQUIN AND MOUTH ASSEMBLY

CROSS-REFERENCE TO RELATED APPLICATIONS

This application claims benefit of U.S. Provisional Patent Application No. 60/373,105, "Taxidermy Head Mannequin and Mouth Assembly", filed Apr. 17, 2002, the subject matter of which is incorporated herein by reference.

BACKGROUND OF THE INVENTION

This invention relates to the art of taxidermy and, more particularly, to a combined taxidermy animal head mannequin and mouth assembly.

Animals are often mounted in an open-mouthed pose, to help illustrate the viciousness of the animal. However, many parts of the mouth of an animal are unsuitable for preservation, especially the soft tissues of the gums, the tongue, and the palate. To address this problem, life-like plastic models of tongues and jaws are commercially available to taxidermists. Plastic models of noses and lips are also available. Nose and lip models are available as discrete components, to be attached separately to the taxidermy model. Such plastic models are typically mounted onto a Styrofoam or plastic model of the animal head. The tanned animal skin is then mounted over the head model. Considerable time and skill are typically required on the part of the taxidermist to affix the nose, the lips, and the interior mouth parts to the head model and to dimensionally match the artificial parts to the tanned hide, in order to obtain a life-like taxidermy model. Painting of artificial components may be required.

In recognition of the labor-intensive nature of the existing approach, the present animal head mannequin and mouth assembly has been developed to provide a more efficient technique by which a life-like taxidermy model of an open-mouthed animal may be prepared.

BRIEF SUMMARY OF THE INVENTION

A combination of an animal taxidermy head mannequin and mouth assembly comprising a mouth shell, a mannequin head and a commercially available jaw set is disclosed. The mouth shell has upper and lower jaws, upper and lower lips, a chin and a nose. The mouth shell is dimensionally adapted to receive the commercially-available jaw set to form the mouth assembly. The mannequin head includes an oral cavity which is dimensionally adapted to receive the mouth assembly.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

DETAILED DESCRIPTION OF THE INVENTION

Figure 1:
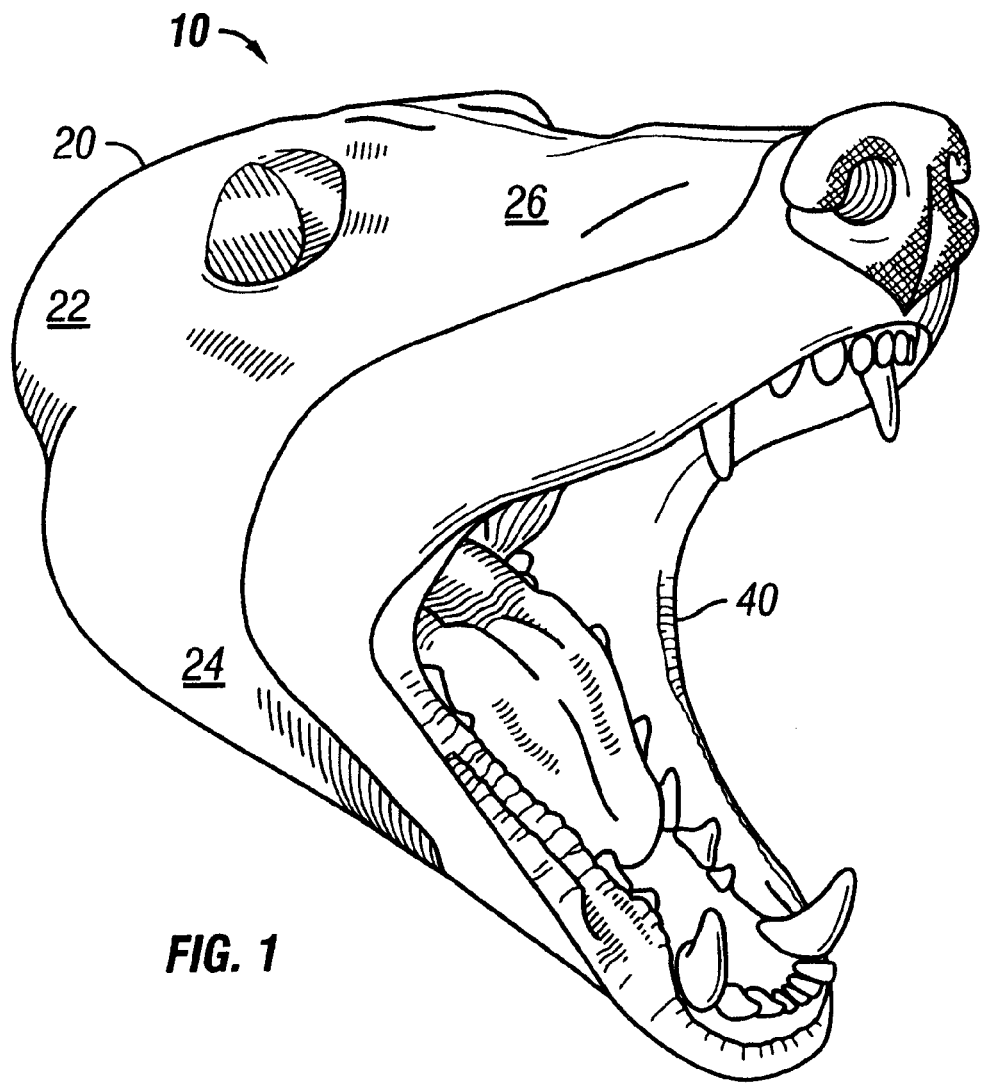
FIG. 1 is a front perspective view drawing of the combination of the mannequin head and mouth assembly, in accordance with in accordance with a preferred embodiment of the present invention.

Certain terminology is used in the following description for convenience only and is not limiting. The words "right", "left", "top", and "bottom" designate directions in the drawings to which reference is made. The words "interior" and "exterior" refer to directions toward and away from, respectively, the geometric center of the core and designated parts thereof. The terminology includes the words above specifically mentioned, derivatives thereof and words of similar import.

Referring to the drawings, wherein like numerals are used to indicate like elements throughout, there is shown in FIGS. 1–6, a preferred embodiment of a combination taxidermy head mannequin and mouth assembly, generally designated 10, in accordance with the present invention. The combination 10 depicts a coyote. However, it should be understood by those skilled in the art that the present invention is not limited to a coyote, but may be used in taxidermy models of other forms of wildlife, such as bears, deer, lions, rabbits, etc.

Figure 2:
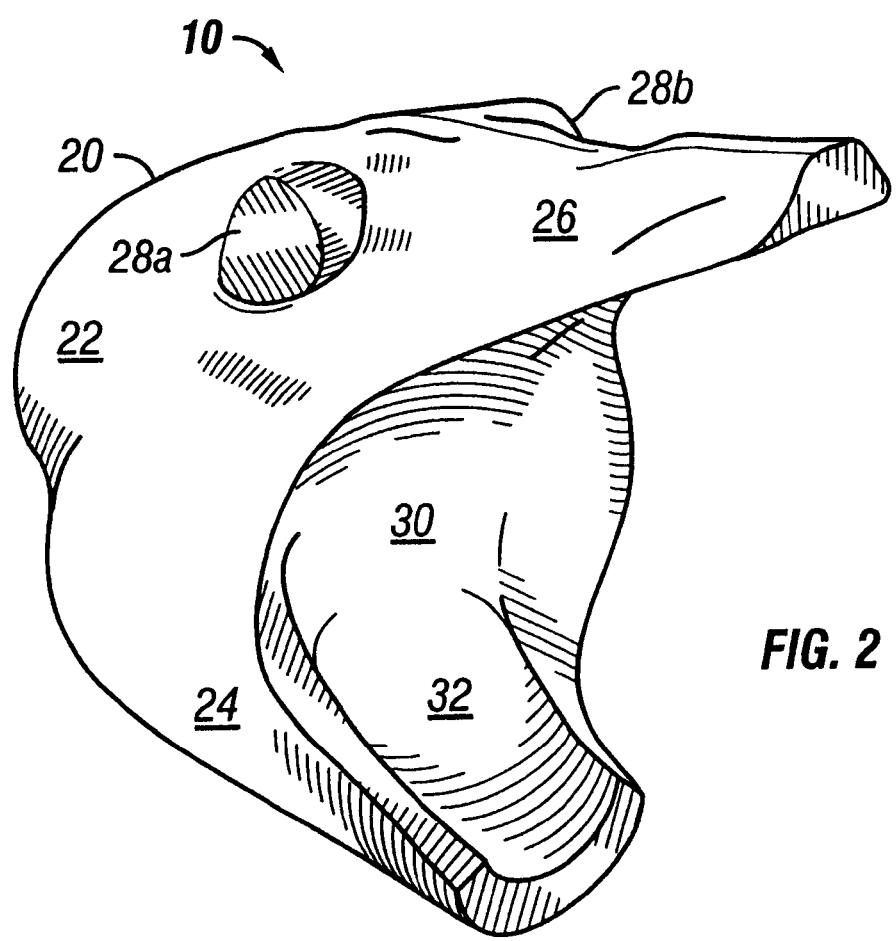
FIG. 2 is a front top perspective view drawing of the mannequin head.

Referring now to FIGS. 1 and 2, the combination 10 includes a mannequin head 20. The mannequin head 20 is preferably made from molded polyurethane foam in a manner well understood by those of ordinary skill in the art. The mannequin head 20 includes a cranial portion 22, a base portion 24, a snout portion 26, first and second eye sockets 28a and 28b, an oral cavity 30 and a truncated lower jaw portion 32. As shown in this preferred embodiment, the snout portion 26 is longer than the lower jaw portion 32. The oral cavity 30 is dimensionally adapted to mate with the mouth assembly 40, described in greater detail herein below. It would be obvious to one skilled in the art from this disclosure that other materials (for example, epoxies, polyesters or urethanes), fabrication techniques (for example, injection molding) or other design arrangements (for example, a shorter snout and/or a longer jaw) could be substituted for the material, fabrication techniques and design arrangement incorporated into the preferred embodiment of the mannequin head 20 without departing from the spirit and scope of the invention.

Referring now to FIGS. 1, 3, 4 and 5, the mouth assembly 40 includes a generally V-shaped hollow mouth shell 42. The mouth shell 42 includes two lower jaw segments 46a, 46b, which join together to form a chin 54. The mouth shell 42 further includes two upper jaw segments 48a and 48b which join together to form an integrally cast nose 56. The upper jaw segments 48a, 48b and the lower jaw segments 46a, 46b join together to form first and second throat joints 44a and 44b, respectively. On the interior edges of the lower jaw segments 46a, 46b, as well as the top of the chin 54, the mouth shell 42 has been molded to resemble lower jaw lips, 52a, 52b. Similarly, the interior edges of the upper jaw segments 48a, 48b and the lower portion of the nose 36 are molded to resemble upper jaw lips 50a, 50b. As shown particularly in FIG. 5, the lower jaw segments 46a, 46b join together at a point about half-way along their length to form a lower jaw body 58. Note further from FIG. 5 that a recess 60 is formed between the lower jaw lips 52a, 52b and the lower jaw body 58. The mouth shell is preferably molded from rigid polymeric materials using molding techniques well known to those of ordinary skill in the art. It will be obvious to the artisan from this disclosure that other materials (for example, epoxies, polyesters or urethanes), fabrication techniques (for example, injection molding) or other design arrangements (for example, the mouth shell opened at a smaller angle) could be substituted for the material, fabrication techniques and design arrangement incorporated into the preferred embodiment of the mouth shell without departing from the spirit and scope of the invention.

Figure 3:
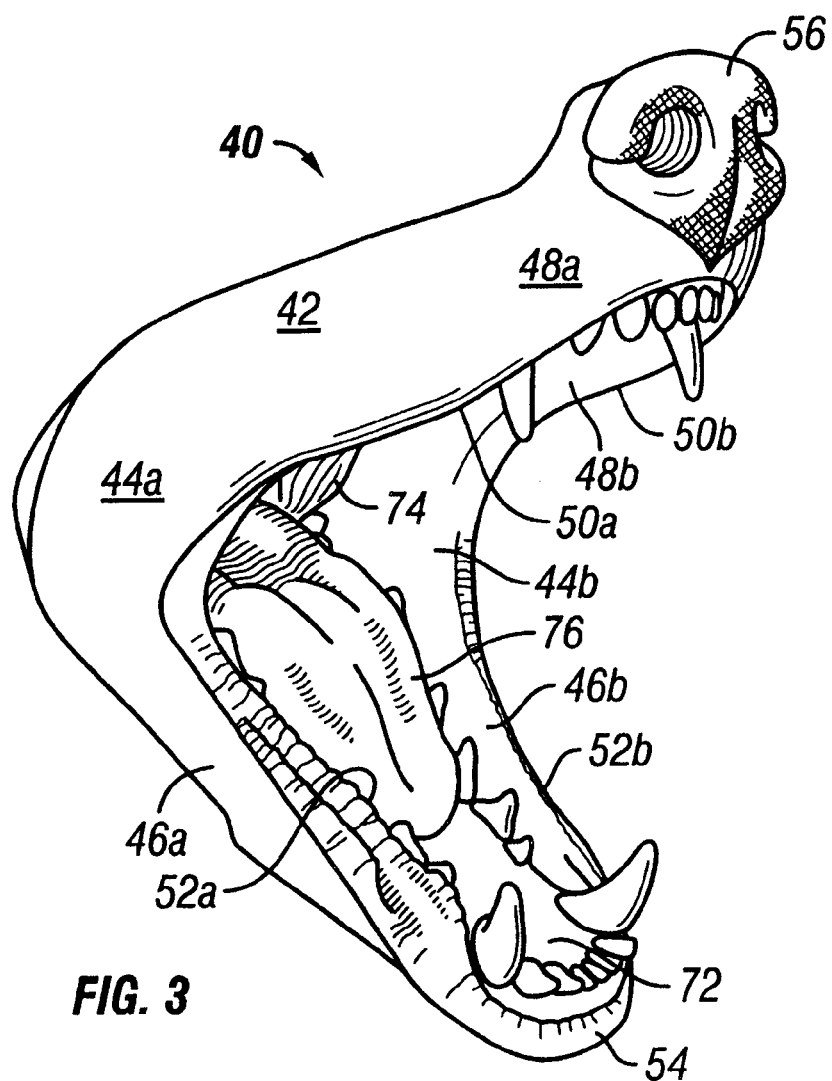
FIG. 3 is a front perspective view drawing of the mouth assembly shown in FIG. 1.
Figure 4:
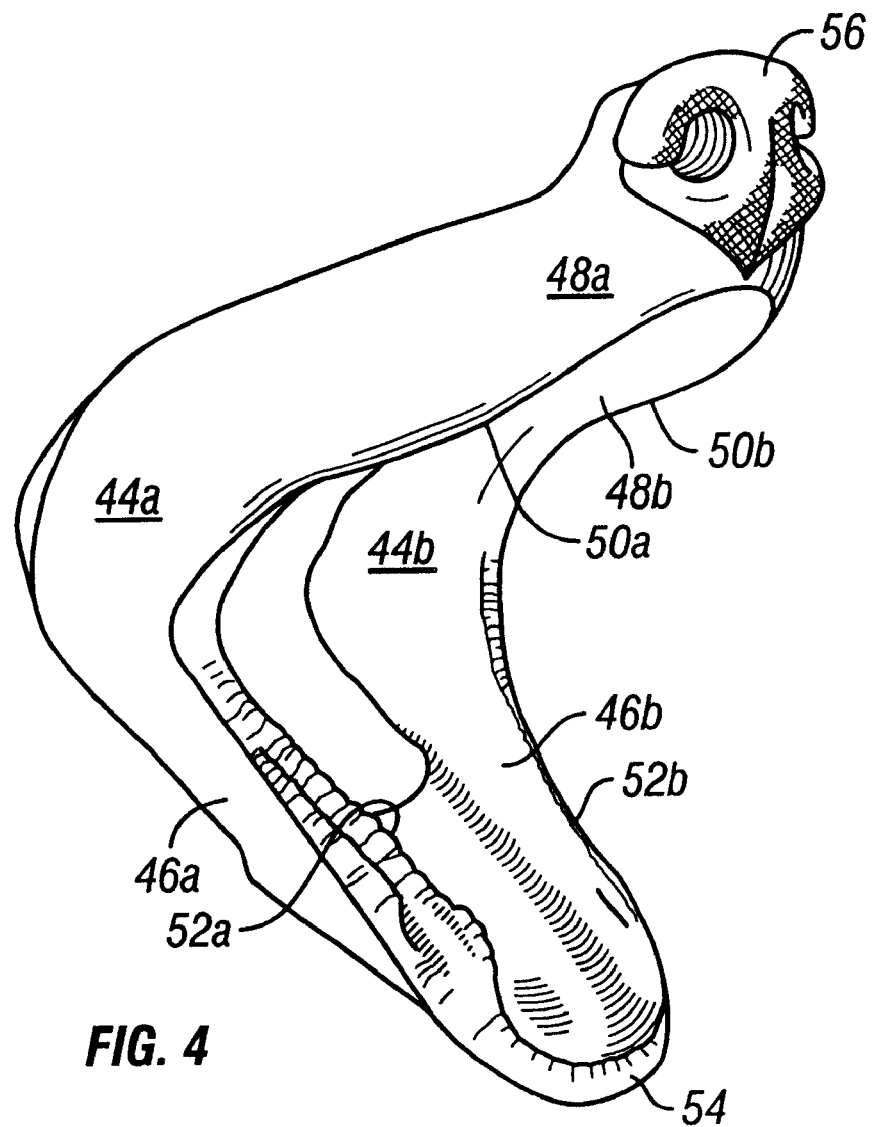
FIG. 4 is a front perspective view drawing of a mouth shell for the mouth assembly shown in FIG. 3.
Figure 5:
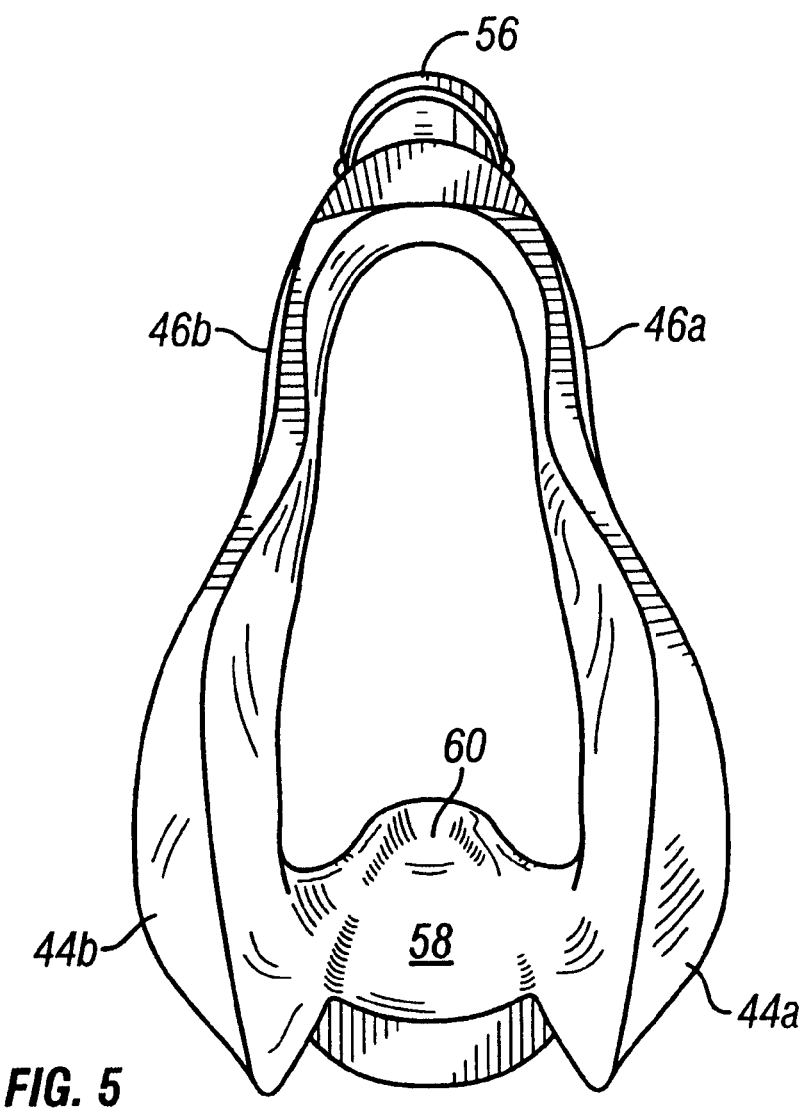
FIG. 5 is a rear perspective view drawing of the mouth shell shown in FIG. 4.
Figure 6:
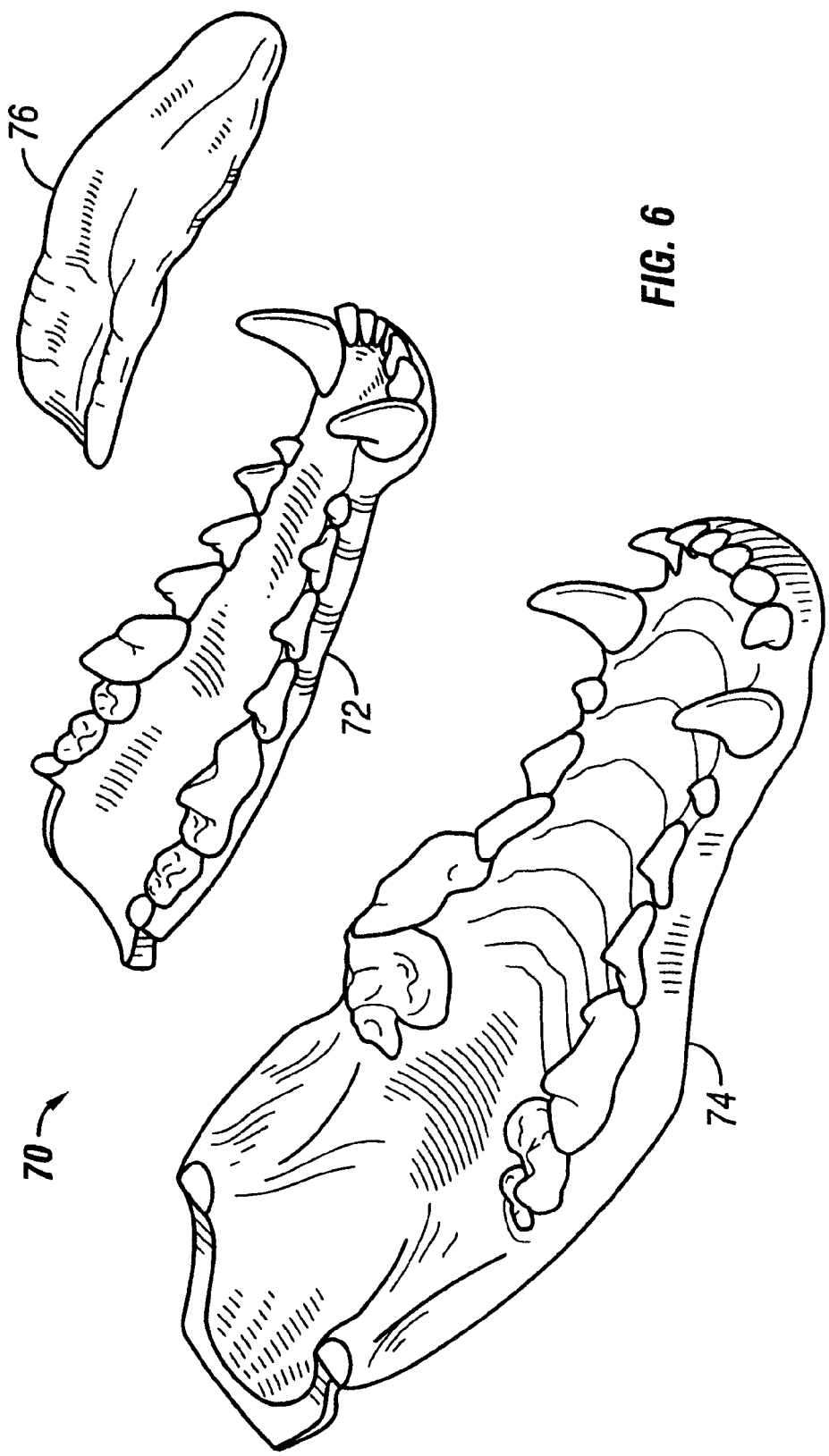
FIG. 6 is a drawing of a commercially available jaw set, including a lower and an upper jaw member and a tongue separated apart, each component shown in a front perspective view.

Referring now to FIGS. 1, 3 and 6, the mouth shell 42 is dimensionally adapted to fit around a commercially available jaw set 70, which includes a lower palate 72, an upper palate 74, and a tongue 76. The lower palate 72 fits between the lower jaws segments 46a, 46b, fitting within the recess 60 and rests upon the lower jaw body 58. Thus, the combination of the lower jaw body 58 and lower jaw segments 46a, 46b maintain the lower palate 72 within the mouth shell 42. The upper palate 74 fits between the upper jaw segments 48a, 48b, and mates with the lower palate 72 at the throat joints 44a, 44b. The space between the upper jaw lips 50a, 50b is less than the width of the upper palate 74 to assist with retaining the upper palate 74 in place during assembly. The tongue 76 rests on the lower palate 72.

Referring now to FIGS. 1 and 3, the combination 10 is assembled from the mouth assembly 40 and the mannequin head 20. The mouth assembly 40 is assembled by inserting the lower palate 72 between the lower jaw segments 46a, 46b into the recess 60 of the mouth shell 42. The upper palate 74 is then inserted between the upper jaw segments 48a, 48b, such that the upper palate 74 mates with and rests upon the lower palate 72 at the throat joints 44a, 44b. The tongue 76 rests on the lower palate 72. An adhesive (not shown) is used to permanently secure the upper palate 74, lower palate 72, and tongue 76 within the mouth shell 42. At final assembly, the mouth assembly 40 is attached to the mannequin head 20 using an adhesive (e.g., glue) (not shown). Alternatively, a mechanical attachment (e.g., screws) could be used to assemble the mouth assembly 40 to the mannequin head 20.

The taxidermist first paints the interior of the mouth shell 42 and the commercially available jaw set 40 as required to match the mouth of the animal being simulated. After the paint has dried, the commercially available jaw set 70 components are readily assembled into the mouth shell 42, and then the mouth assembly 40 is mounted into the mannequin head 20. The preserved hide is then mounted to the combined head and mouth assembly 10 using techniques well known to those skilled in the art of taxidermy.

Advantages which the present invention provides over the prior art include the integrally cast nose 56 of the mouth shell 42. A pre-mounted, integral nose saves the taxidermist the significant time required to mount a non-integral nose and improves the quality of the final taxidermy model. Use of the mouth shell 42 which is designed to fit a commercially available jaw set also saves the taxidermist time, and also improves the quality of the final taxidermy model. A further improvement of the invention over existing approaches is that it eliminates the need for thin parts in the mannequin head 20, which is expected to facilitate manufacturing of the heads.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

We claim:

1. A combination of an animal taxidermy head mannequin and a mouth assembly including a commercially-available taxidermy jaw set, the combination comprising:

a mouth shell having upper and lower jaws, upper and lower lips, a chin and a nose, the mouth shell being dimensionally adapted to receive the commercially available jaw set to form the mouth assembly; and the mannequin head including an oral cavity dimensionally adapted to receive the mouth assembly.

2. The combination of an animal taxidermy mannequin head and mouth assembly of claim 1, wherein the mouth shell is formed as a single unitary component.

3. The combination of an animal taxidermy mannequin head and mouth assembly of claim 1, wherein the mouth shell is molded from a rigid polymeric material.

4. The combination of an animal taxidermy mannequin head and mouth assembly of claim 1, wherein the mannequin head is formed as a single unitary component.

5. The combination of an animal taxidermy mannequin head and mouth assembly of claim 1, wherein the mannequin head is molded from polyurethane.

* * * * *